United States Patent
Welschinger et al.

(10) Patent No.: US 10,066,636 B2
(45) Date of Patent: Sep. 4, 2018

(54) AXIALLY SPLIT PUMP

(71) Applicant: Sulzer Management AG, Winterthur (CH)

(72) Inventors: Thomas Welschinger, Radolfzell (DE); Heike Tischler, Winterthur (CH); Berthold Vogel, Schwieberdingen (DE)

(73) Assignee: SULZER MANAGEMENT AG, Winterthur (CH)

( * ) Notice: Subject to any disclaimer, the term of this patent is extended or adjusted under 35 U.S.C. 154(b) by 298 days.

(21) Appl. No.: 14/946,852

(22) Filed: Nov. 20, 2015

(65) Prior Publication Data
US 2016/0160871 A1  Jun. 9, 2016

(30) Foreign Application Priority Data
Dec. 5, 2014  (EP) .................................. 14196439

(51) Int. Cl.
| | |
|---|---|
| *F04D 29/08* | (2006.01) |
| *F16J 15/06* | (2006.01) |
| *F04D 29/42* | (2006.01) |
| *F04D 29/62* | (2006.01) |
| *F04D 1/06* | (2006.01) |

(Continued)

(52) U.S. Cl.
CPC ............ *F04D 29/086* (2013.01); *F04D 1/06* (2013.01); *F04D 17/08* (2013.01); *F04D 29/083* (2013.01); *F04D 29/22* (2013.01); *F04D 29/28* (2013.01); *F04D 29/4206* (2013.01);
(Continued)

(58) Field of Classification Search
CPC .......... F04D 1/06; F04D 17/08; F04D 29/083; F04D 29/086; F04D 29/22; F04D 29/28; F04D 29/426; F04D 29/4206; F04D 29/624; F04D 29/628; F16J 15/06
See application file for complete search history.

(56) References Cited

U.S. PATENT DOCUMENTS

| | | | | |
|---|---|---|---|---|
| 8,858,157 | B2 * | 10/2014 | Welschinger | F04D 7/04 415/58.4 |
| 9,316,314 | B2 * | 4/2016 | Meuter | F16J 15/06 |
| 2015/0300365 | A1 * | 10/2015 | Montemayor | F16J 15/062 415/214.1 |

FOREIGN PATENT DOCUMENTS

| | | |
|---|---|---|
| EP | 2636905 A1 | 9/2013 |
| JP | 6224079 Y2 | 6/1987 |

(Continued)

OTHER PUBLICATIONS

Extended European Search Report dated Jun. 10, 2015 in European Patent Application No. 14196439.5, Filed Dec. 5, 2014.

*Primary Examiner* — Igor Kershteyn
(74) *Attorney, Agent, or Firm* — Global IP Counselors, LLP

(57) ABSTRACT

An axially split pump for conveying a fluid includes an axially split housing with a bottom part and a cover. The bottom part has a first sealing surface and the cover has a second sealing surface. The bottom part and the cover are fastened to one another so that the two sealing surfaces are in direct contact with one another. At least one first sealing groove for the reception of a first sealing element is disposed in the sealing surfaces. A second sealing groove is disposed for the reception of a second sealing element. The first sealing groove and the second sealing groove are connected to one another through a connection region and an elastic pre-loading element is disposed in the connection region, which exerts a pre-load onto one of the two sealing elements.

19 Claims, 8 Drawing Sheets

(51) Int. Cl.
*F04D 17/08* (2006.01)
*F04D 29/22* (2006.01)
*F04D 29/28* (2006.01)

(52) U.S. Cl.
CPC ......... *F04D 29/426* (2013.01); *F04D 29/624* (2013.01); *F04D 29/628* (2013.01); *F16J 15/06* (2013.01)

(56) References Cited

FOREIGN PATENT DOCUMENTS

| | | |
|---|---|---|
| JP | 6375665 U | 5/1988 |
| WO | 2014083374 A1 | 6/2014 |
| WO | 2014095787 A1 | 6/2014 |

\* cited by examiner

AXIALLY SPLIT PUMP

CROSS-REFERENCE TO RELATED APPLICATIONS

This application claims priority to EP Application No. 14196439.5, filed Dec. 5, 2014, the contents of which is hereby incorporated herein by reference.

BACKGROUND

Field of Invention

The invention relates to an axially split pump for conveying a fluid.

Background Information

Axially split pumps, which are also referred to as horizontally divided pumps, are pumps in which the housing is divided in parallel with the axis of the shaft and thus has a bottom part and a cover. Both the bottom part, as well as the cover each have a flange which are placed on top of one another for a mounting of the pump and are then fixedly connected to one another, for example are screwed to one another.

Axially split pumps have been known for a long time and are produced in a variety of embodiments, typically as centrifugal pumps, for example as single flow or dual flow pumps and as single stage or multi-stage pumps. In this connection the impeller of the pump can be arranged between two bearings (between bearing pump). Also the field of application of these pumps is very wide, for example, they are used in the oil and gas industry or in the water industry or in the field of generation of energy. Frequently axially split pumps are configured for a high operating pressure or for large volume flows and are suitable for pumping over large geodetic heights, for the conveyance through water pipelines or oil pipelines or for the desalination of sea water by means of reverse osmosis.

Naturally, the seal between the bottom part and the cover of the housing along the two flanges is of great importance having regard to axially split pumps. In this respect it is true, on the one hand, to seal the inner space of the pump with respect to the environment and, on the other hand, to seal such pressure spaces with respect to one another in the inner space of the pump in which different pressures are present in the operating state, such as is, for example the case for multi-stage pumps.

For sealing between the bottom part and the cover it is known to insert a flat seal between the two flanges, in particular for applications with high pressure, such that the two flanges do not directly contact one another in the mounted state, but rather contact the flat seal at both sides. Such flat seals require a high pre-load, in particular also in order to achieve the required aerial pressing between the bottom part, the cover and the flat seal.

An alternative technology for sealing between the bottom part and the cover, as is, for example also described in the WO-A-2014/083374, consists therein of mounting the flanges of the bottom part and of the upper part directly on top of one another without a seal lying there between. The respective surfaces of the two flanges then form sealing surfaces that have direct contact with one another in the mounted state. Having regard to this solution at least one sealing groove is typically provided in the bottom part or in the cover or in the bottom part and in the cover, the sealing groove extending at both sides of the shaft over the complete axial length of the pump and with a string-like sealing element, for example, an O-ring-like sealing element being inserted into the sealing groove. After insertion of the string-like sealing element into the sealing groove, the bottom part and the cover are fixedly screwed to one another such that the sealing surfaces of the two flanges are in direct contact with one another and the string-like sealing element is elastically deformed in the sealing groove, in order to thus ensure a reliable seal.

SUMMARY

As no flat seal is inserted between the flange of the bottom part and that of the cover having regard to this solution, the screw connections, by means of which the bottom part and the cover are fastened to one another, have to bear a significantly reduced load. From this a few advantages result: for example, the flanges which form the sealing surfaces can be configured considerably thinner and narrower, less material is required for the flanges which brings about a cost and weight saving; smaller screws and/or bolts can be used for the screwing together of the bottom part and the cover, for this reason the screws and/or bolts can also be placed closer to the hydraulic contour. Moreover, the use of the string-like sealing element permits a larger deformation of the housing in comparison to the use of flat seals. This is in particular of advantage having regard to multi-stage pumps, as the leakage between different pressure spaces in the pump in which different pressures are present can be significantly reduced or can even be avoided.

The sealing elements are typically manufactured from an elastomer, such as are also used for common O-ring seals, for example from a nitrile rubber or a nitrile butadiene rubber (NBR).

For most applications more than one sealing groove with a respective one of a string-like sealing element or a ring-like sealing element being provided in each. Thus, for example, an inner string-like sealing element can be provided for the seal of the suction space with regard to the pressure space and an outer string-like sealing element can be provided which seals the inner space of the pump with respect to the outside world, this means with regard to the environmental pressure. In particular having regard to multi-stage pumps, additional sealing grooves can be provided, each being provided with an inserted string-like element in order to seal the different pressure spaces with respect to one another, with different pressures being present in the different pressure spaces in the operating state.

Having regard to the design of such seals by means of string-like sealing elements one strives to design the individual string-like sealing elements, if possible, as closed, this means in particular as ring-like sealing elements, as the connection or contact points between individual sealing elements can potentially lead to leaks, in particular then when the pump is designed for a high operating pressure of, for example up to 100 bar. However, from a pure construction point of view it is not possible to exclusively make provision for sealing elements closed with respect to one another. Critical points will always exist at which two individual sealing elements have to bound one another or have to be connected to one another and which have to cooperate with one another for the desired seal.

Such a critical point is the connection between the housing of the pump and the side covers of the pump, a point at which a total of three components bound one another, namely the bottom part of the housing, the cover of the housing and the side cover. At this critical point the pump, has to be sealed with respect to the environment and/or the environmental pressure. Leaks present here not only lead to a reduction of the efficiency of the pump but rather, depending on the fluid conveyed by the pump, can also lead to pollutions of the environment by escaping fluid, for example having regard to liquids such as fossil oil or crude oil.

A different critical point is a connection to and/or the contact of the outer sealing element, which serves for the seal with respect to the environment of the pump, with such sealing elements that bound pressure spaces with respect to one another in the interior of the pump, in which different pressures are present in the operating state. Thus, for example, having regard to a multi-stage pump, an inner sealing element which serves for the seal between two stages has to be connected to and/or brought into contact with the outer sealing element. This connection must be reliable and in the case of maintenance work has to be repairable without larger demands in effort and cost or special tooling.

Starting from the described state of the art it is thus an object of the invention to suggest an axially split pump for conveying a fluid in which a reliable seal can be ensured also at connection points between sealing elements for all operating states and in particular also during a long term operation of the pump.

The subject matter of the invention satisfies this object.

In accordance with the invention thus an axially split pump for conveying a fluid is suggested, having an axially split housing that comprises a bottom part and a cover, wherein the bottom part has a first sealing surface and the cover has a second sealing surface, wherein the bottom part and the cover can be fastened to one another in such a way that the two sealing surfaces have direct contact with one another, wherein at least one first sealing groove for the reception of a first sealing element is provided in the sealing surfaces and wherein at least one second sealing groove for the reception of a second sealing element is provided, wherein the first sealing groove and the second sealing groove are connected to one another by a connection region; and wherein an elastic pre-loading element is provided in the connection region which exerts a pre-load onto one of the two sealing elements.

Preferably, a first sealing element is inserted into the first sealing groove and a second sealing element is inserted into the second sealing groove.

Through the provision of the pre-loading element in the connection region between the two connection grooves, a pre-load is generated onto at least one of the sealing elements which ensures a secure contact and a sealing contact of the sealing element, for example with the wall of the sealing groove into which the sealing element is inserted, for all operating states. The pre-load in this respect is preferably directed in such a way that it pre-loads the sealing element in the direction of the decreasing pressure. Through the pre-loading element a particularly good and reliable seal can be realized in particular in the connection region between the two sealing elements.

The pre-loading element further provides the advantage that a very good sealing effect is achieved, already at lower operating pressures, this means for example on a start of the pump. Furthermore, the advantage results that, following a longer operating duration of the pump when degradations or other changes could arise in the sealing element, the elastic pre-loading element compensates these changes and reliably presses the sealing element against the wall of the sealing groove or against a different contact pattern.

In accordance with a preferred embodiment a cut-out for the reception of the pre-loading element is provided in the connection region such that this can be placed securely at the desired position.

The pre-loading element is preferably spring elastic and is particularly preferably configured as a spring.

In order to realize a good pre-load it has been found to be advantageous when the pre-loading element extends in parallel with the first sealing element or in parallel with the second sealing element.

In a preferred embodiment the first sealing groove or the second sealing groove are configured for the reception of a string-like sealing element. In dependence on the position of the pump at which the seal should take place between individual sealing elements, different preferred variants exist that can naturally also all be realized together at different positions in the same pump:

A variant consists therein that the first sealing groove and the second sealing groove are configured for the reception of a string-like sealing element. This variant is suitable for the connection and/or the contacting of two string-like sealing elements, as can, for example be realized in multi-stage pumps.

A different variant consists therein that the first sealing groove or the second sealing groove is configured for the reception of a ring-like sealing element. This variant is suitable, for example at such connection points, where a ring-like sealing element, e.g. an O-ring must cooperate with a string-like sealing element. This is, for example, the case at a side cover of the pump.

A further variant consists therein that the connection region is configured in such a way that the first and the second sealing element in the connection region can extend substantially in parallel. This variant is in particular suitable in order to replace and/or to realize an actually T-shaped connection between two sealing positions.

An advantageous measure further consists therein when at least the first sealing groove is provided in the bottom part of the housing, as this in particular enables a more simple manufacture and a simpler mounting.

In accordance with a preferred embodiment, the first sealing groove is arranged for the seal of the inner space of the pump with respect to the environmental pressure. As this sealing groove can be designed continuous—this means without interruptions—over the overall axial length of the pump a particularly reliable seal can be realized hereby between the inner space of the pump and the environment.

A likewise preferred embodiment is provided when the second sealing groove is provided at a side cover which closes the housing of the pump with respect to an axial direction. As three components typically bound one another at this critical point, namely the bottom part and the cover of the housing, as well as the side cover and in this example a seal has to take place with respect to the environment of the pump, the solution in accordance with the invention is suitable, in particular also for this position in order to ensure a secure seal.

A further preferred embodiment consists therein that the second sealing groove is arranged for the seal between two pressure spaces in the pump in which different pressures exist during the operating state.

Having regard to the material it is preferred when the sealing elements are manufactured from an elastomer, in particular from a nitrile rubber, specifically from nitrile butadiene rubber (NBR).

The pump in accordance with the invention is in particular suitable also for very high operating pressures and can preferably be designed as a centrifugal pump having a design pressure of at least 50 bar, preferably of at least 100 bar.

Further advantageous measures and designs of the invention result from the dependent claims.

BRIEF DESCRIPTION OF THE DRAWINGS

The invention will be explained in more detail hereinafter with reference to the drawings.

DETAILED DESCRIPTION OF THE EMBODIMENTS

Figure 1:
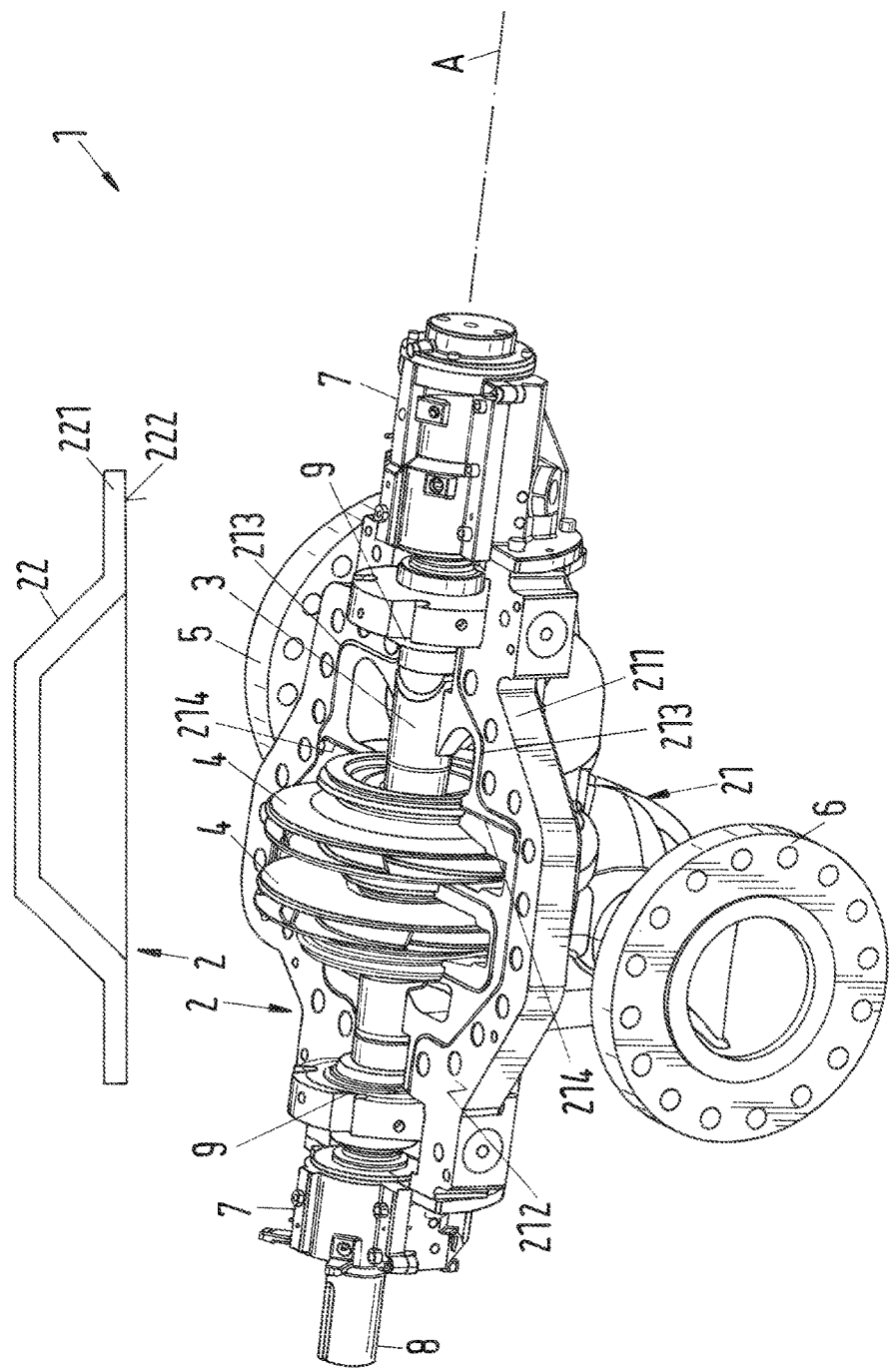
FIG. 1 is a perspective illustration of an embodiment of a pump in accordance with the invention, wherein the cover is removed and is only symbolically indicated.
Figure 2:
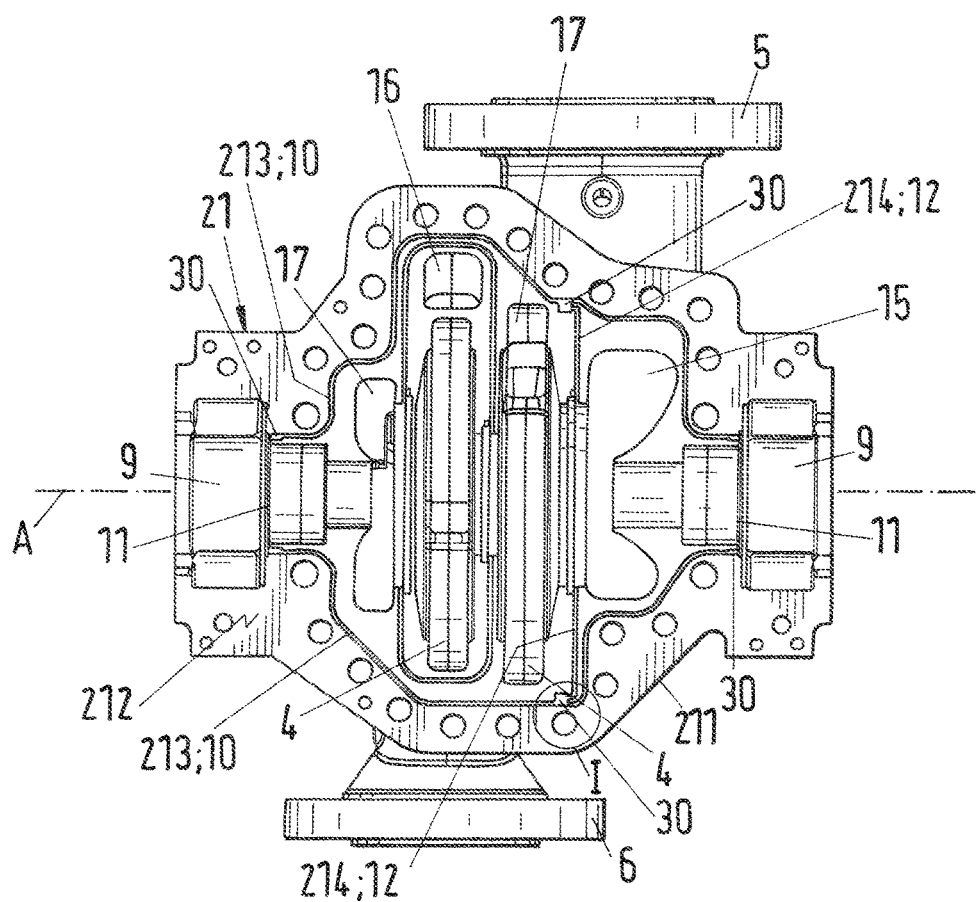
FIG. 2 is a top view onto the bottom part of the housing of the embodiment of FIG. 1.

FIG. 1 in a perspective illustration shows an embodiment of an axially split pump in accordance with the invention which is referred to in totality by means of the reference numeral 1. The pump 1 comprises a housing 2 that is axially split and that has a bottom part 21 as well as a cover 22. For a better understanding the cover 22 is removed in FIG. 2 and is only symbolically indicated. FIG. 2 shows a top view onto the bottom part 21 of the housing 2 of this embodiment.

The housing 2 comprise an inlet 5 for sucking in a fluid to be conveyed, as well as an outlet 6 for the fluid. The pump 1 further comprises a rotatable shaft 3 whose longitudinal direction determines an axial direction A. At least one impeller 4 is rotatably fixedly mounted at the shaft 3, in the present case two impellers 4 are mounted which convey the fluid from the inlet 5 to the outlet 6. Furthermore, a respective bearing apparatus 7 is provided at both ends with respect to the axial direction A of the pump 1, in order to support the shaft 3 of the pump 1. The left hand bearing apparatus 7 in accordance with the illustration (FIG. 1) is furthermore provided with a clutch 8 that can be connected to a non-illustrated drive which displaces the shaft 3 of the pump 1 into rotation.

The term axially split pump 1 and/or axially split housing 2 is meant as generally used in such a way that the housing 2 is divided in parallel with the longitudinal direction of the shaft 3, this thus means in a plane which includes the longitudinal axis of the shaft 3.

In particular the pump 1 illustrated in FIG. 1 and FIG. 2 is an axially split multi-stage centrifugal pump—in this example a two-stage centrifugal pump—that is of single flow design and is in a so-called between-bearing-arrangement, this means the impellers 4 are present between the bearing apparatuses 7. It is understood that the invention is not limited to such pump types, but rather is also suitable for all other pumps with axially split housing 1, for example single stage pumps, this means such pumps having only one impeller 4, dual-flow pumps having a single stage or multi-stage design or different pump types in comparison to centrifugal pumps.

Having regard to the axial direction A, the housing 2 of the pump 1 is respectively closed by a side cover 9 which in the present case simultaneously forms the closure cover of the mechanical shaft seal.

The cover 22 and the bottom part 21 of the housing 2 are in direct contact with one another in the mounted state, this means that no flat seal is provided between these two parts which would prevent the direct contact between the bottom part 21 and the cover 22. For this purpose the bottom part 21 comprises a first flange 211 which in the mounted state extends in the plane of the axial division of the housing 2 and its upper surface in accordance with the illustration forms a first sealing surface 212. In an analog-like manner the cover 22 is provided with a second flange 221 that extends in the mounted state in the plane of the axial division of the housing 2 and its lower surface in accordance with the illustration (FIG. 1) forms a second sealing surface 222.

Following the mounting of the cover 22 onto the bottom part 21, the first sealing surface 212 and the second sealing surface 222 are in direct contact with one another in order to form a sealing connection between the bottom part 21 and the cover 22 of the housing 2. A first sealing groove 213 is provided in the first sealing surface 212 of the bottom part 21, the first sealing groove extending from the left hand side cover 9 in accordance with the illustration in the axial direction A following the inner contour of the pump 1 up to the other side cover 9. This first sealing groove 213 is provided at both sides of the shaft 3. A first sealing element 10 is inserted into the first sealing groove 213 which extends over the total length of the sealing groove 213, in this example the first sealing element is configured as a string-like sealing element 10 and extends over the complete length of the first sealing groove 213. The first sealing element 10 seals the inner space of the pump 1 with respect to the environment. For this reason the first sealing groove 213 is also referred to as an outer sealing groove 213. The first sealing element 10, in the present case a string-like sealing element, typically has a round cross-section, such as is, for example, known from common O-rings. Naturally it is also possible that the string-like sealing element has a different cross-section, for example, a rectangular cross-section and in particular a quadratic cross-section. In this connection the first sealing element 10 is dimensioned in such a way with respect to its diameter that it projects beyond the boundary of the first sealing groove 213 in the un-mounted state. During the mounting of the cover 22 onto the bottom part 21, the first string-like sealing element 10 is thus elastically deformed and thus ensures a reliable seal between the bottom part 21 and the cover 22 of the housing 2.

The fastening of the cover 22 onto the bottom part 21 preferably takes place by means of bolts or screws which engage through bores or threaded bores (without reference numerals in FIG. 1 and FIG. 2) provided in the first sealing surface 212 in such a way that the bottom part 21 and the cover 22 are fixedly screwed to one another and are screwed together in a sealing manner.

Alternatively it is also possible to provide the sealing groove 213 in the cover 22 of the housing 2, or to provide a sealing groove both in the bottom part 21 as well as in the cover 22. For reasons of manufacture and mounting it is preferred to provide the sealing groove 213 and/or the sealing grooves 213 only in the bottom part 21.

The first sealing groove 213 and/or the first sealing element inserted into it must typically be connected to or brought into contact with other sealing grooves and/or sealing elements such that these two sealing elements can cooperate. Such connection points are typically critical regions, as leaks can potentially be brought about here in a simpler manner.

In the following the invention will be described with reference to examples of two such critical connection points, namely with reference to the seal between the housing 2 and the side cover 9 and with reference to the region referred to with I in FIG. 2, where a sealing element must cooperate between two adjacent pressure spaces of the pump 1 with the first respectively the outer sealing groove 213 and the first sealing element 10 inserted therein. It is naturally understood that preferred embodiments of the invention exist in which these two critical connection points and possibly like or analog-like connection points are all configured in accordance with the invention. Naturally, it is also however possible and, depending on the case of application, possibly also preferred, when not all critical connection points are configured in accordance with the invention, but rather, for example, only the seal between the side cover 9 and the housing 2 or only one different connection point between the two sealing elements is configured in such a way.

Figure 3:
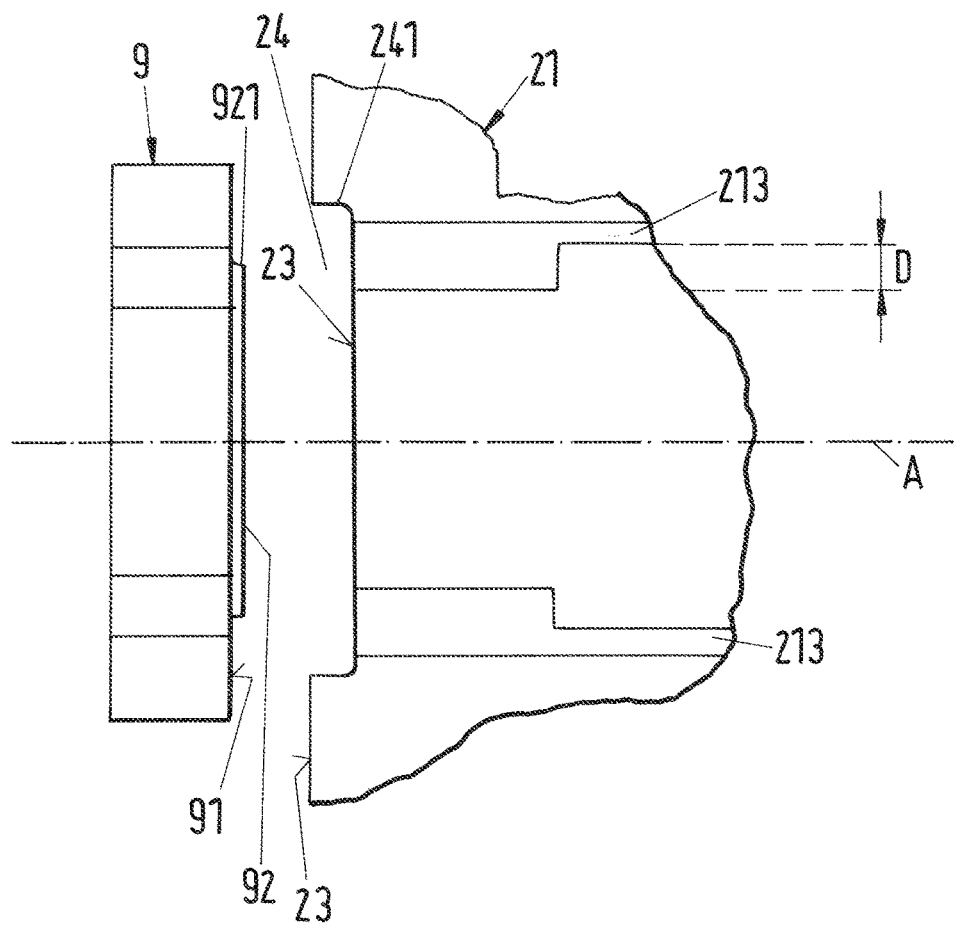
FIG. 3 is the side cover of the embodiment of FIG. 1, as well as a part of the housing.

Having regard to the explanation of the seal between the side cover 9 and the housing 2, FIG. 3 in an enlarged illustration shows the side cover 9 and a part of the housing 2 in a top view onto the bottom part 21, wherein the side cover 9 has not yet been joined to the housing 2. In order to seal between the side cover 9 and the housing 2 the side cover 9 has a first contact surface 91 which cooperates with a second contact surface 23 that is provided at the housing 2. The second contact surface 23 surrounds the shaft 3 and extends both over the bottom part 21 of the housing 2 as well as over the cover 22 of the housing 2. One can also recognize the first sealing groove 213 in the bottom part 21 of the housing 2 in FIG. 3, the first sealing groove extending up into the second contact surface 23 of the housing 2.

The sealing connection between the side cover 9 and the housing 2 represents a particular challenge, as here three components bound one another, namely the side cover 9, the bottom part 21 and the cover 22 of the housing 2. The first contact surface 91 of the side cover 9 is formed by one of its bounding surfaces in the axial direction A. The second contact surface 23 of the housing 2 stands perpendicular to the axial direction A in such a way that it is disposed opposite of the first contact surface 91.

A recess 24 is provided in the second contact surface 23 of the housing 2 which in this example is configured as a central cut-out in the second contact surface 23. Furthermore, a projection 92 is provided in the first contact surface 91 of the side cover 9, the projection in this example being configured as a central elevation. The recess 24 and the projection 92 are in this respect configured and arranged with respect to one another in such a way that they together form a second sealing groove 29 (see FIG. 4), which in this example is configured as a ring-like groove and which serves for the reception of a second sealing element 11 that in the present example is configured as a ring-like sealing element in the mounted state of the side cover 9.

For this purpose the central cut-out which forms the projection 24 in the second contact surface 23 is configured with a substantially circular cross-section whose diameter is larger than the diameter of the elevation configured likewise with a substantially circular cross-section, the elevation forming the projection 92 in the first contact surface 91 having regard to the embodiment described in this example. Thereby the second sealing groove 29 formed together arises only after the joining of the side cover 9 and of the housing 2. This second sealing groove 29 is consequently radially outwardly bound by the sidewall 241 of the recess 24 in the second contact surface 23 of the housing 2 and radially inwardly bound by the lateral bounding surface 921 of the projection 92 in the first contact surface 91 of the side cover 9.

Figure 4:
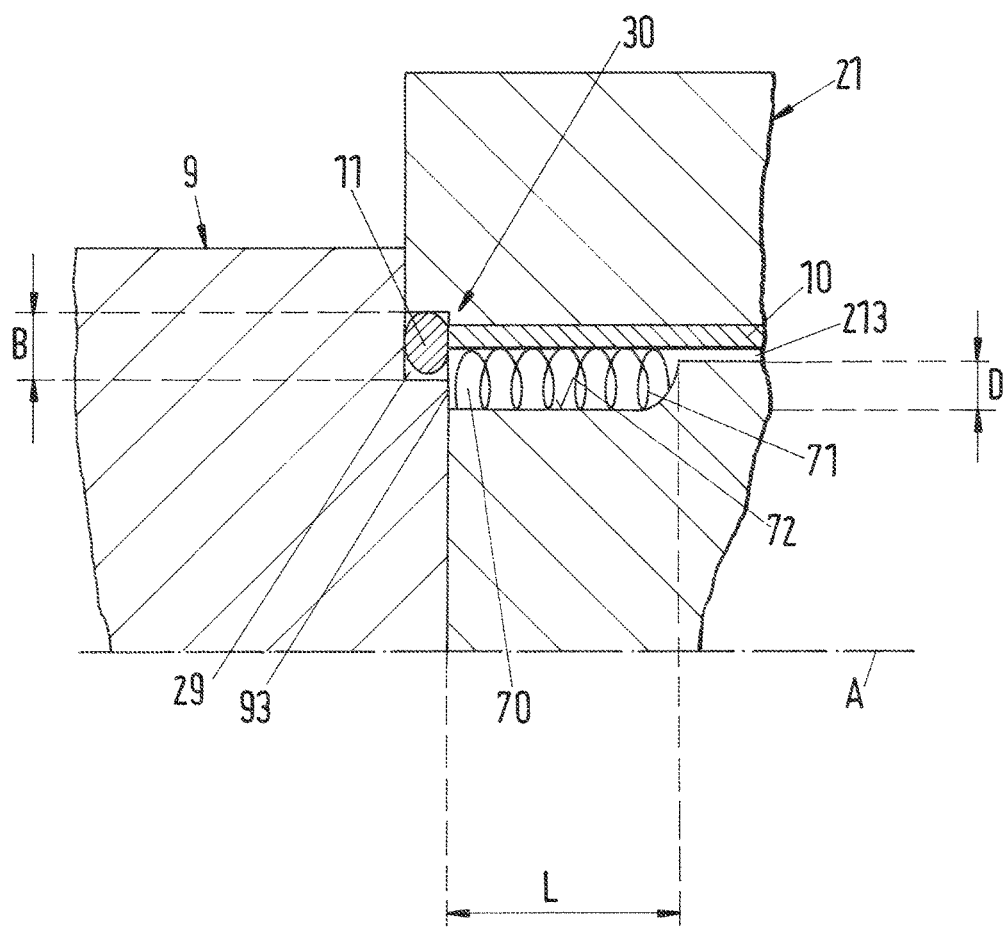
FIG. 4 is a schematic illustration of the side cover and of the housing in the assembled state with inserted sealing elements.

In a schematic illustration of the side cover 9 and parts of the housing 2 in the mounted state and for reasons of better understanding FIG. 4 shows the second sealing groove 29 which arises through the joining of the side cover 9 and of the housing 2. FIG. 4 is limited to the illustration of the upper half of FIG. 3, as this is sufficient for the understanding. In FIG. 4 the second sealing element 11 is inserted into the second sealing groove 29 and the first sealing element 10 is inserted into the first sealing groove 213 in this example.

Through the joining of the side cover 9 and of the housing 2, the second sealing groove 29 arises through the cooperation of the projection 92 in the side cover 9 and of the recess 24 in the housing 2, the second sealing groove surrounding the shaft 3 of the pump 1. Within the region limited by the second sealing groove 29, the first contact surface 92 and the second contact surface 23 are in direct contact with one another after mounting of the side cover.

As is likewise evident from FIG. 4 it is preferred that the first sealing groove 213 opens substantially perpendicular into the second sealing groove 29. As the end surface of the string-like first sealing element 10 placed at the second contact surface 23 preferably has a planar, this means non-curved, cross-sectional surface, an as good as possible contact can be realized between the string-like first sealing element 10 and the ring-like second sealing element 11 in the second sealing groove 29 can be realized through this measure.

It is also preferred when the radial width of the second sealing groove 29—this means its extent perpendicular to the axial direction A—is larger than the width of the string-like first sealing element 10. The first sealing groove 213 is then arranged in such a way that it preferably opens centrally into the second sealing groove 29.

The first sealing groove 213 and the second sealing groove 29 are consequently connected to one another through a first connection region 30 in which the first sealing groove 213 opens into the second sealing groove 29. In accordance with the invention an elastic pre-loading element 71 is provided in the connection region 30 which exerts a pre-load onto one of the two sealing elements 10, 11.

Preferably the pre-loading element 71 is spring elastic and particularly preferably configured as a spring 71, as is the case in the embodiment described in this example. For the reception of the spring 71 the connection region 30 has a cut-out 70. The cut-out 70 is provided at the opening of the first sealing groove 213 into the second contact surface 23 and/or into the second sealing groove 29 and is arranged lying radially inwardly with respect to the first sealing groove 213. The cut-out 70 extends in parallel with the first sealing groove 213 in such a way that the first sealing groove 213 in its end region has an extent in the radial direction enlarged by the width D of the cut-out 70 in the axial direction A over a length L. As is shown in FIG. 4 the bounding surface 72 lying radially inward of the cut-out 70 is arranged in such a way that it lies closer to the shaft 3 than the bounding surface of the second sealing groove 29 lying radially inward. Thereby a section 93 that is a part of the first contact surface 91 of the side cover 9 and at which the spring 71 can be supported exists between the second sealing groove 29 and the bounding surface 72 of the cut-out 70 arranged lying radially inward with respect to the second sealing groove 29.

The spring 71 inserted into the cut-out 70 of the connection region 30 generates a radially outwardly directed preload onto the string-like first sealing element 10. The spring 71 extends in parallel with the string-like first sealing element 10 and is dimensioned in such a way that it is wider than the width D of the cut-out 70 with respect to the radial direction. Following the mounting of the side cover 9, the spring 71 can be supported at the section 93.

The pre-loading element and/or the spring 71 is preferably arranged in such a way that the pre-load on the sealing element 10 is generated in the direction of the decreasing pressure, in accordance with the illustration in FIG. 4 this means radially outwardly. As is evident in particular from FIG. 2, during the operation of the pump 1 environmental or atmospheric pressure is present outside of the housing 2, whereas an increased pressure is present in the interior of the housing 2. The pressure thus decreases from the inside to the outside, consequently the spring 71 (see FIG. 4) is arranged in such a way that the pre-load generated by it acts on the first sealing element 10 in the direction of the decreasing pressure.

The pre-loading element 71 provided in accordance with the invention thus also ensures a reliable seal at connection points between sealing elements for all operating states of the pump 1.

The pre-loading element 71 provides several advantages. Thus, during the mounting it is, for example, possible to insert the string-like first sealing element 10 into the first sealing groove 213 and to fix its end region at the second sealing groove 29 by means of the pre-loading element 71 in the correct position. During the operation of the pump 1, the pre-loading element 71 ensures an additional contribution such that, also for smaller operating pressures, this means, for example on a start of the pump 1, a sufficient sealing effect is realized straight away between the housing 2 and the side cover 9. Also having regard to the long term operation of the pump 1 the pre-loading element 71 is advantageous. If namely degradations, fatigue or other changes or appearances of wear of the string-like first sealing element 10 are brought about with an increase in the operating duration of the pump 1, then these can be compensated by means of the effect of the pre-loading element 71, as this reliably presses the first sealing element 10 against the wall of the sealing groove 213 lying radially outward.

Having regard to the seal explained in this example between the side cover 9 and the housing 2 of the pump 1, the first sealing groove 213 is thus provided for the reception of the string-like sealing element 10 and is arranged in the bottom part 21 of the housing. The second sealing groove 29 is provided for the reception of the second sealing element 11, in this example a ring-like second sealing element, and is arranged at the side cover 9 which closes the housing 2 of the pump 1 with regard to the axial direction A. In this connection the second sealing groove 29 is formed only after joining by means of the cooperation of the side cover 9 with the housing 2.

The first sealing groove 213 having the string-like first sealing element inserted therein is arranged for the seal of the inner space of the pump 1 with respect to the environmental pressure having regard to the embodiment described in this example.

Figure 5:
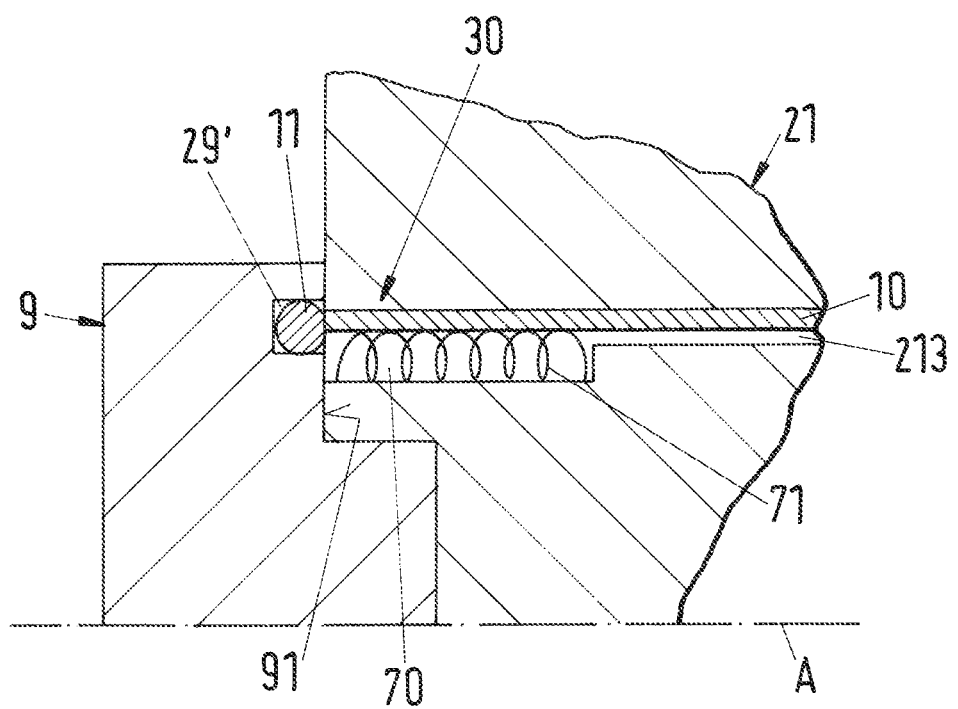
FIG. 5 is like FIG. 4, however for a variant of the embodiment.

FIG. 5 in an illustration analog to that shown in FIG. 4 shows a variant for the embodiment in accordance with FIG. 1 and FIG. 2. In the following reference will only be made to the differences to the described embodiment. Otherwise the previous explanations are true in a like or analog-like manner also for this variant. In particular the reference numerals for like parts or parts having an equivalent function have the same meaning.

A second sealing groove 29' is provided in the variant illustrated in FIG. 5 that is completely arranged in the side cover 9 and that does not only arise as described in the foregoing through the cooperation of the side cover 9 with the housing 2. For this purpose the second sealing groove 29' of ring-like design is provided in the first contact surface 91 of the side cover 9, the second sealing groove surrounding the shaft 3 of the pump 1 concentrically in the mounted state. The second sealing element 11 of ring-like design is inserted into the second sealing groove 29' which cooperates with the string-like first sealing element 10 in the connection region 30. Having regard to this variant the seal in the connection region 30 predominantly takes place by means of an axial sealing arrangement, this means mainly through a seal in the axial direction, whereas for the design shown in FIG. 4, an axial seal is combined with a radial seal.

Naturally the seal can take place in a like manner as described in the foregoing also at the other of the two side covers 9.

In the following a second critical connection point will be explained, namely the region referred to with I in FIG. 1, where a sealing element must cooperate between two adjacent pressure spaces of the pump 1 with the first respectively the outer sealing groove 213 and the first sealing element 10 inserted therein. The previously made explanations are true in a like or analog-like manner also for this connection point. The reference numerals have the same meaning as was described already in the foregoing.

The pump 1 in the embodiment in accordance with FIG. 1 and FIG. 2 is configured as a two-stage centrifugal pump. In this way a plurality of pressure spaces exist in the interior of the pump 1, in which different pressures are present in the operating state (see FIG. 2): In a suction space 15 of the pump 1 the suction pressure is present at the inlet 5 of the pump 1; the conveying pressure is present in an outlet space 16 which makes available the fluid at the outlet 6 of the pump 1. An intermediate pressure is present in an intermediate space 17 whose magnitude lies between that of the suction pressure and that of the conveying pressure. Having regard to the two-stage pump 1, the fluid to be conveyed is conveyed starting from the inlet 5 through the right hand impeller 4 of the first stage 17 in accordance with the illustration into the intermediate space and in this respect is brought up to the intermediate pressure. The left hand impeller 4 of the second stage in accordance with the illustration conveys the fluid from the intermediate space 17 to the outlet space 16 where it is then present at the conveying pressure and is made available at the outlet 6 of the pump 1.

In order to seal between the different pressure spaces in the pump 1 further sealing grooves are provided. At least one further second sealing groove 214 is provided in the bottom part 21 which is also referred to as an inner sealing groove 214, as it serves for the seal between different pressure spaces in the pump, in the present embodiment the second sealing groove 14 serves for the seal between the suction space 15 and the intermediate space 17. As is in particular shown in FIG. 2 the second sealing groove 214 is likewise provided at both sides of the shaft 3. A string-like second sealing element 12 is inserted into the second sealing groove 214 which extends over the overall length of the second sealing groove 214. Also the string-like second sealing element 12 typically has a round cross-section, such as is, for example, known from common O-rings. Naturally it is also possible that the string-like second sealing element has a different cross-section, for example a rectangular cross-section and in particular a quadratic cross-section. In this connection the second sealing element 12 is dimensioned with respect to its diameter in such a way that it projects beyond the boundary of the second sealing groove 214 in the un-mounted state. During the mounting of the cover 22 onto the bottom part 21 the second sealing element 12 is thus elastically deformed and in this way ensures for a reliable seal between the suction space 15 and the intermediate space 17.

Alternatively it is also possible to provide the first and/or the second sealing groove 213 and/or 214 as well as possible further sealing grooves in the cover 22 of the housing 2, or both in the bottom part 21 as well as in the cover 22. From manufacturing and mounting points of view it is preferred when all sealing grooves 213, 214 are only provided in the bottom part 21.

Figure 6:
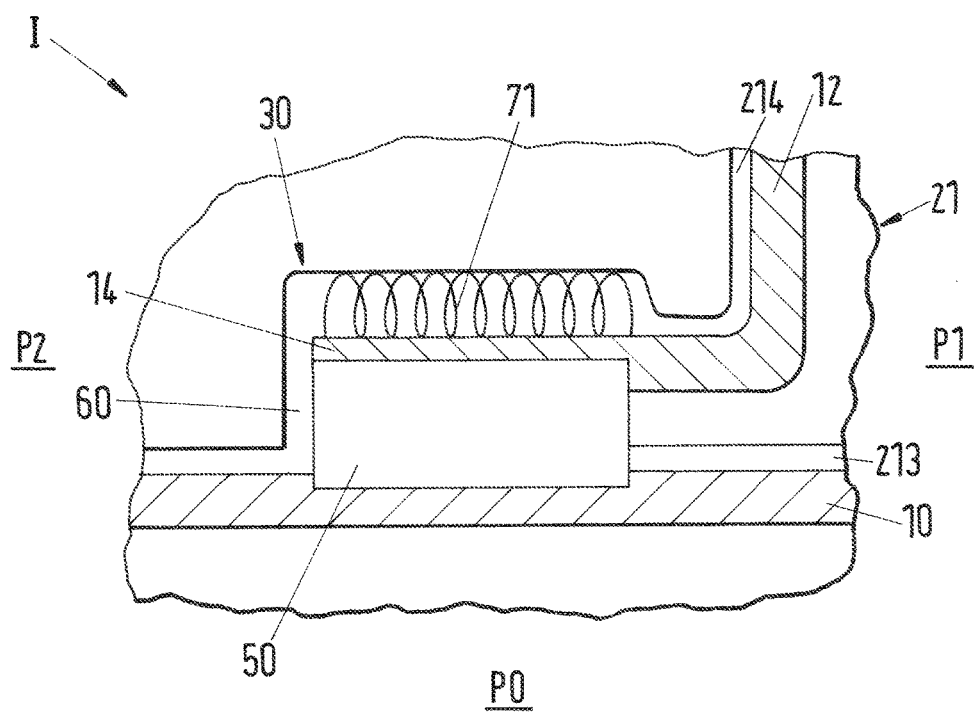
FIG. 6 is a schematic illustration of the detail I of FIG. 2.

As is shown in particular in FIG. 2 the second sealing groove 214 extends in the radial direction perpendicular to the axial direction A. The second sealing groove 214 is connected through the connection region 30 to the first sealing groove 213 in this way the two sealing elements 10 and 12 can cooperate and/or be connected. This will be explained in the following in detail. For this purpose FIG. 6 shows the connection region 30 of the second sealing groove 214 having the first sealing groove 213 in an enlarged and schematic illustration of the detail I of FIG. 2. For a better understanding the first and the second string-like sealing element 10 and/or 12 are respectively illustrated in a hatched manner in FIG. 4.

Figure 7:
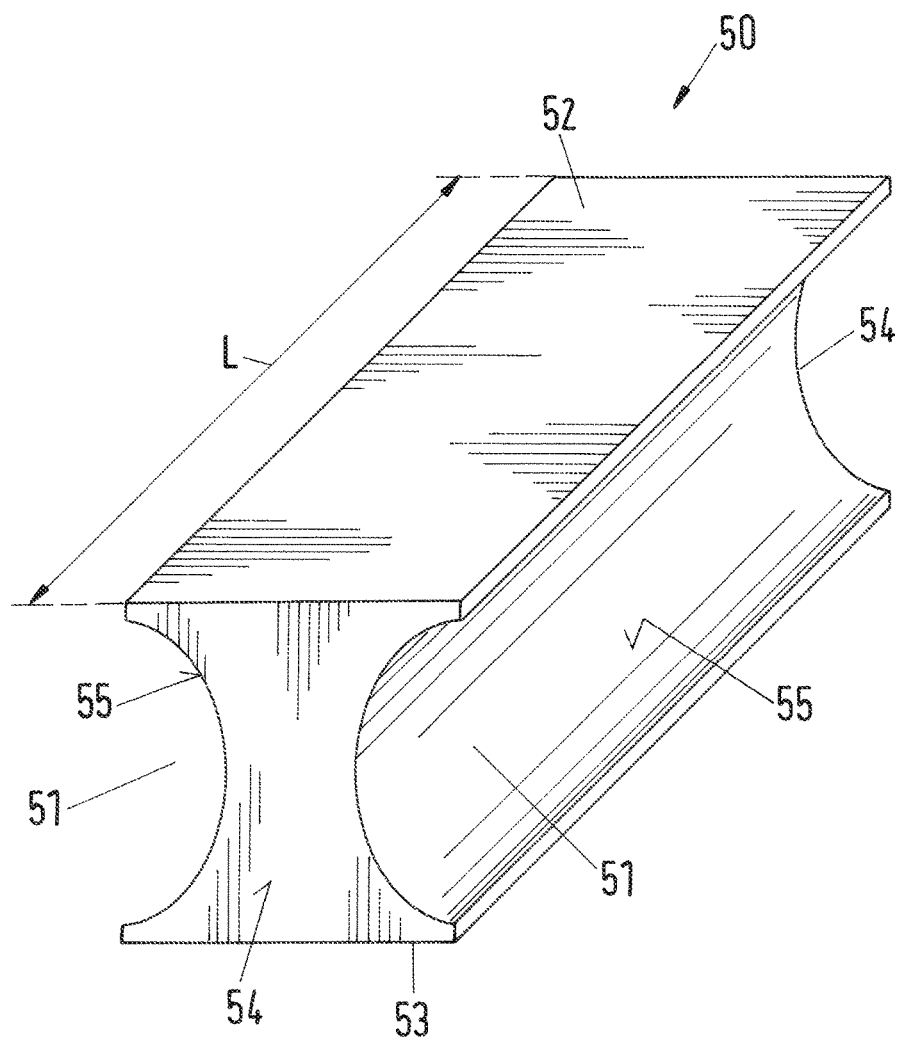
FIG. 7 is a perspective illustration of an embodiment of a connection element.
Figure 8:
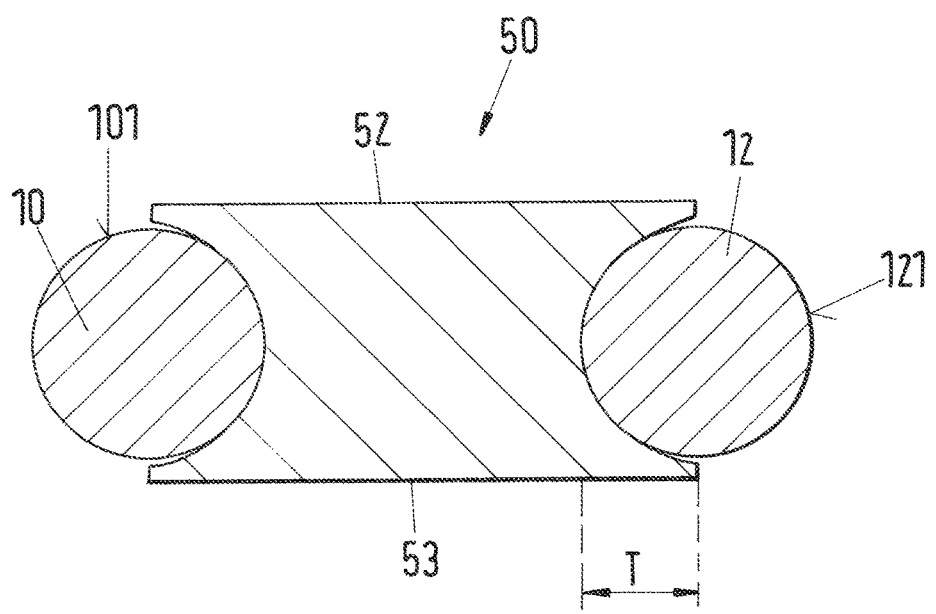
FIG. 8 is a cross-section through the connection element with inserted sealing elements.

A connection element 50 is provided in the connection region 30. For a better understanding FIG. 7 shows a perspective illustration of an embodiment of a connection element 50 and FIG. 8 shows a cross-section through the connection element 50, wherein in FIG. 8 the two string-like sealing elements 10, 12 are inserted into the connection element 50.

Furthermore, the pre-loading element 71 is provided in the connection region 30, the pre-loading element also in this example being preferably spring elastic and particularly preferably being configured as a spring 71. The spring 71 extends in parallel with the straight end 14 of the second sealing element 12 and exerts a pre-load onto this which presses the second sealing element 12 and/or its straight end 14 against the connection element 50. This pre-load is transmitted through the connection element 50 also onto the first sealing element 10.

The connection element 50 (see FIG. 7 and FIG. 8) has a rectangular bottom side 53 and a rectangular upper side 52 extending in parallel thereto which are connected by two end surfaces 54. Its longitudinal extent is referred to as the length L. The connection element 50 has two lateral cut-outs 51 which respectively extend over the total length L between the end surfaces 54. The lateral cut-outs 51 are each configured for the reception of one of the string-like sealing elements 10 and/or 12 and—depending on the sealing element—can be configured identical or different from one another. The two lateral cut-outs 51 extend in parallel with one another, such that the two string-like sealing elements 10 and/or 12 lie in parallel with or substantially in parallel with one another after their insertion into the cut-outs 51 in the region of the connection piece 50. In this way the connection region 30 is configured in such a way that the first and the second sealing element 10 and/or 12 extend substantially in parallel in the connection region 30.

Each of the lateral cut-outs 51 of the connection element 50 has an inner contour 55 which respectively follows the jacket surface 101 and/or 121 of each of the string-like first and/or second sealing elements 10 and/or 12 which are inserted in the cut-out 51. If, for example, the sealing elements 10, 12 have a circular cross-sectional surface—as is illustrated in FIG. 8—then the inner contour 55 of the cut-outs 51 perpendicular to the longitudinal extent of the cut-out 51 is likewise curved circular arc-like, with the radius of curvature substantially corresponding to that of the respective sealing element 10, 12.

From this measure an as large as possible large area contact results between the respective sealing element 10, 12 and the connection piece 50.

The depth T of the lateral cut-out 51 perpendicular to its longitudinal extent can be adapted in dependence on the case of application. Having regard to sealing elements 10, 12 with circular cross-section it has in practice however been found sufficient when the cut-out 51 contacts at most half, preferably less than half of the jacket surface 101, 121 of the first and/or second sealing elements 10, 12. Depending on the case of application and the design of the respective sealing element the depth T can be different for the two cut-outs 51. Also the curvature of the inner contour 55 can be different for the two cut-outs 51. In the present embodiment the depth T and the curvature of the inner contour 55 is the same for the two cut-outs 51.

As is shown in FIG. 6 a cut-out 60 is provided in the connection region 30 of the two sealing grooves 213, 214 into which the connection element 50 and the spring 71 can be inserted. The string-like first sealing element 10 is continuous in the region of the connection element 50, this means it does not have to be cut apart or be manipulated in any other way, but it is simply inserted into the corresponding lateral cut-out 51.

The string-like second sealing element 12 has the end 14 in the connection region 30. This straight end 14 is inserted into the other one of the two lateral cut-outs 51 of the connection element 50 and in this way extends in parallel with the string-like first sealing element 10 in the region of the connection element 50 and/or in the connection region 30. The second sealing element 12 is dimensioned with respect to its length preferably in such a way that its end 14 terminates in a substantially flush manner with the end surface 54 of the connection element 50 after insertion into a lateral cut-out 51. In this way an as large as possible large area sealing contact between the respective sealing element 10, 12 and the lateral cut-out 51 receiving this is ensured.

The arrangement emphasized in FIG. 6 enables the replacement of otherwise T-shaped connections or contact points between separate sealing elements 10, 12 by means of a particularly good sealing connection in which the two sealing elements 10, 12 are guided in parallel with one another in the connection region 30 and in which a pre-load is additionally generated by means of the spring 71 which presses the second sealing element 12 against the inner contour 55 of the connection element 50.

In the operating state a smaller pressure P1 then acts at the right hand side in accordance with the illustration of the second sealing element 12 in FIG. 6 than at the left hand side in accordance with the illustration where the pressure P2 is present. In accordance with the illustration then the environmental pressure and/or atmospheric pressure P0 is present at the outside of the housing 2 beneath the first sealing element 10. The two sealing elements 10, 12 are pressed in a sealing manner against the wall of the first and/or the second sealing groove 213, 214, on the one hand, by means of the pressure difference, on the other hand, the pressure difference supported by the pre-load generated by the spring 71 presses the second sealing element 12 against the inner contour 55 of the lateral cut-out 51, wherefrom also a force effect is transmitted by the connection element 50 onto the first sealing element 10 that is thereby pressed against the wall of the first sealing groove 213.

The connection element 50 is preferably manufactured from a plastic and can, for example, be an injection molded part. Whereas primarily the shaping of the connection element 50 is essential for an as good as possible contact with the respective sealing element 10 and/or 12, it can still, for example be advantageous when the connection element 50 is elastically deformable.

Having regard to the arrangement illustrated in FIG. 6 the cut-out 60 in the connection region 30 is configured in such a way that the spring 71 extends in parallel with the longitudinal extent and/or with the longitudinal extent of the connection element 50 and in this way in parallel with the second string-like sealing element 12. The arrangement of the spring 71 is in this connection such that the pre-load is generated in the direction of the decreasing pressure, this means downwardly in accordance with the illustration according to FIG. 6.

Also having regard to this arrangement, the pre-loading element 71 provides the advantages already described in the foregoing. During the operation of the pump 1 the pre-loading element 71 ensures an additional contribution to the effect that, also for smaller operating pressures, this means, for example, on a start of the pump 1, a sufficient sealing effect is realized straight away between the housing 2 of the pump 1 and the environment and/or between the suction space 15 and the intermediate space 17. Also having regard to the long term operation of the pump 1, the pre-loading element 71 is advantageous at this position. If namely degradations, fatigue or other changes or appearances of wear of the sealing elements 10 and/or 12 are brought about with the increasing operating duration of the pump 1 then these can be compensated through the effect of the pre-loading element 71 as this presses the sealing elements 10 and/or 12 reliably against the connection element 50 and/or the wall of the sealing groove 214.

The improved sealing effect at the connection point between the individual sealing elements 10, 11, 12 is advantageous in particular also having regard to an as high as possible operating pressure of the pump 1. Thus, the pump 1 can, for example, be designed in an embodiment as a centrifugal pump having a design pressure of at least 50 bar and preferably of at least 100 bar.

As a material both for the first string-like sealing element 10 as well as for the two second sealing elements 11, 12, in particular all known materials are suitable which are used for such seals, in particular elastomers, such as nitrile rubber and in particular nitrile butadiene rubber (NBR).

Also when the invention is explained only with detailed reference to two connection regions 13 between two separate sealing elements, it is naturally understood that the seal can be realized in a like or analog-like manner with the aid of a pre-loading element 71 at one or more connection or contact points between sealing elements. In this connection the corresponding seal can be configured both as an axial seal (see FIG. 5) and also as a radial seal or as a combined axial and radial seal (see FIG. 4) seal. Naturally the invention is also suitable for such multi-stage pumps which have more than two stages.

What is claimed is:

1. An axially split pump for conveying a fluid, comprising:
an axially split housing comprising a bottom part and a cover, the bottom part has a first sealing surface and the cover has a second sealing surface, the bottom part and the cover configured to be fastened to one another so that the first and second sealing surfaces are in direct contact with one another, at least one first sealing groove disposed in at least one of the first and second sealing surfaces for the reception of a first sealing element, and at least one second sealing groove disposed for the reception of a second sealing element, the first sealing groove and the second sealing groove being connected to one another through a connection region, an elastic pre-loading element being disposed in the connection region, the pre-loading element configured to exert a pre-load onto one of the first and second sealing elements.

2. A pump in accordance with claim 1, wherein the first sealing element is inserted into the first sealing groove and the second sealing element is inserted into the second sealing groove.

3. A pump in accordance with claim 1, wherein a cut-out is disposed in the connection region for the reception of the pre-loading element.

4. A pump in accordance with claim 1, wherein the pre-loading element is elastic.

5. A pump in accordance with claim 1, wherein the pre-loading element extends in parallel with the first sealing element or in parallel with the second sealing element.

6. A pump in accordance with claim 1, wherein the first sealing groove or the second sealing groove is configured to receive one of the first and second string-like sealing elements.

7. A pump in accordance with claim 1, wherein the first sealing groove and the second sealing groove are configured to receive one of the first and second string-like sealing elements.

8. A pump in accordance with claim 1, in which the first sealing groove or the second sealing groove is configured to receive a ring-like sealing element.

9. A pump in accordance with claim 1, wherein the connection region is configured so that the first and the second sealing elements are capable of extending substantially in parallel in the connection region.

10. A pump in accordance with claim 1, wherein at least the first sealing groove is disposed in the bottom part of the housing.

11. A pump in accordance with claim 1, wherein the first sealing groove is arranged to seal an inner space of the pump from environmental pressure.

12. A pump in accordance with claim 1, wherein the second sealing groove is disposed at a side cover configured to close the housing of the pump with respect to an axial direction.

13. A pump in accordance with claim 1, wherein the second sealing groove is arranged to seal between two pressure spaces in the pump, the two pressure spaces having different pressures in an operating state.

14. A pump in accordance with claim 1, wherein the sealing elements are an elastomer.

15. A pump in accordance with claim 1, configured as a centrifugal pump having a design pressure of at least 50 bar.

16. A pump in accordance with claim 1, wherein the pre-loading element is a spring.

17. A pump in accordance with claim 1, wherein the sealing elements are a nitrile rubber.

18. A pump in accordance with claim 1, wherein the sealing elements are a nitrile butadiene rubber.

19. A pump in accordance with claim 1, configured as a centrifugal pump having a design pressure of at least 100 bar.

* * * * *